United States Patent [19]

Binder et al.

[11] 4,151,756
[45] May 1, 1979

[54] TENSIONING DEVICE FOR GEAR BELTS, CHAINS AND THE LIKE

[75] Inventors: Robert Binder, Schwieberdingen; Wolfgang Schmid, Markgröningen, both of Fed. Rep. of Germany

[73] Assignee: Dr. Ing.h.c.F. Porsche Aktiengesellschaft, Fed. Rep. of Germany

[21] Appl. No.: 836,620

[22] Filed: Sep. 26, 1977

[30] Foreign Application Priority Data

Sep. 25, 1976 [DE] Fed. Rep. of Germany ....... 2643230

[51] Int. Cl.² .......................... F16H 7/12; F16H 7/10
[52] U.S. Cl. ........................ 74/242.11 R; 74/242.15 R
[58] Field of Search ................ 74/242.1 A, 242.15 R, 74/242.11 R, 242.11 A, 242.14 R, 230.17 T, 242.11 C; 60/527

[56] References Cited

U.S. PATENT DOCUMENTS

| | | | |
|---|---|---|---|
| 3,413,866 | 12/1968 | Ford | 74/242.11 R |
| 3,785,220 | 1/1974 | Jacobs | 74/242.15 R X |

FOREIGN PATENT DOCUMENTS 2535676  2/1977  Fed. Rep. of Germany ... 74/242.11 A

*Primary Examiner*—Leonard H. Gerin
*Attorney, Agent, or Firm*—Craig & Antonelli

[57] ABSTRACT

Gear belt tensioning apparatus is provided for controlling the tension in a gear belt for driving an internal combustion engine camshaft or the like. This apparatus includes a tension roller which engages directly with the gear belt and which is controlled by a temperature responsive control element. In order to accommodate for changes in temperature of the internal combustion engine, the control element is composed of a plurality of stacked bimetal dish-shaped spring members arranged in a cylindrical recess of an abutment fixed to the engine housing. These spring members are arranged in packets of four members each, which packets are then arranged so as to have the spring members of one packet facing in the opposite direction of the next adjacent packet of spring members.

11 Claims, 1 Drawing Figure

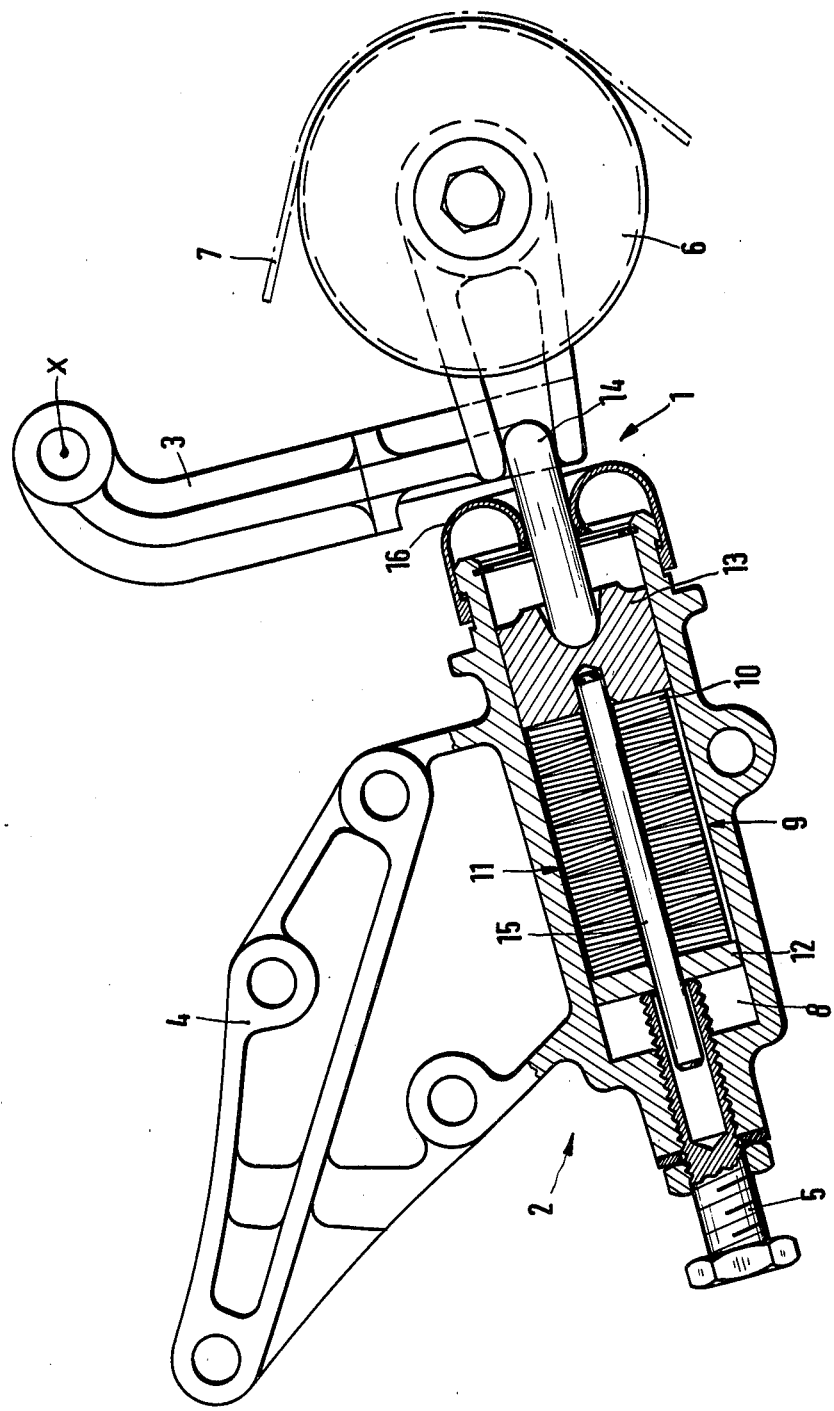

TENSIONING DEVICE FOR GEAR BELTS, CHAINS AND THE LIKE

BACKGROUND AND SUMMARY OF THE INVENTION

The invention relates to a tensioning device for gear belts, chains (toothed belts, chains) and the like. Preferred embodiments of the invention relate to such tensioning devices for a camshaft drive of an internal combustion engine. In such tensioning devices, a tension pulley or roller is provided which cooperates directly with a gear or toothed belt. The distance of the tension pulley or roller from an adjustable support arranged at the internal combustion engine housing is influenced by a heat-depending control element to thereby control the tension of the gear or belt.

A tensioning device for belts, chains or the like is known (DT-PS No. 856,980) which is constructed with a tension roller arranged on a lever swingable about an axis, and which is pressed with tension against the belt by, for example, a spring. As a result of the spring characteristic, an exact matching to the various temperature-dependent operating ranges of the internal combustion engine, is not possible in this case.

For avoiding this disadvantage, a tensioning device is known through an older patent application (DOS 2,535,676), in which a tension roller is arranged at an axial-adjustable housing which is supported at an adjustable abutment whereby the tensioning device includes elastic blocks arranged in the housing and between which a swing-lever is arranged so as to cooperate with a heat-dependent control element. With this arrangement, however a relative high vibration of the elastic block has proven to be especially disadvantageous since, as a result of these vibrations, a flutter-free operation of, for example, the toothed belt during all rotation ranges of the internal combustion engine was not attained and the operating noise of the toothed belt was increased considerably and the life of the belt was reduced. In addition, the change in length of the control element, constructed with bimetal, was extensively compensated through the elastic blocks so that thereby, for the belt tension itself, not enough attention was given to the variable heat conditions at the internal combustion engine to the required extent.

It is an object of the invention to create a tensioning device for toothed or gear belts, chains or the like, especially for a camshaft drive of an internal combustion engine, through which a uniform gear belt tension is assured in all occurring stationary and unstationary operating conditions of the internal combustion engine.

Inventively, this is solved with a tensioning device of the type mentioned at the outset wherein the heat-dependent control element is constructed by a number of bimetal-disk springs which are stacked together in alternating directions.

The advantages obtained with the inventive tensioning device consist especially therein, that all criteria for assuring satisfactory operation of, for example, a belt, are fulfilled. The required gear-belt tension is maintained between the maintenance intervals and is the same with all occurring stationary and unstationary operating conditions. Further, a skipping of the gear belt during return rotation of the internal combustion engine is safely assured and a flutter-free operation of the gear belt is assured in a sufficient measure at every rotative speed.

These and other objects, features and advantages of the present invention will become more apparent from the following description when taken in connection with the accompanying drawings, which show, for purposes of illustration only, a single embodiment in accordance with the present invention.

BRIEF DESCRIPTION OF THE DRAWINGS

The single drawing FIGURE is a part-sectional side view of a temperature responsive belt tensioning device constructed in accordance with a preferred embodiment of the invention.

DETAILED DESCRIPTION OF THE INVENTION

The entire tensioning device 1 comprises an abutment 2 and a support arm 3 which is supported swingably (about axis x) at the not shown housing of the internal combustion engine. The abutment 2 is constructed with a receiver 4 also arranged at the housing of the internal combustion engine and a screw bolt 5 adjustably guided in the receiver 4. The support arm 3 serves for the reception of tension roller 6 which is pressed against the gear belt 7. The receiver 4 is provided with a cylindrical recess 8 in which is arranged a heat-dependent control element 9. The control element 9 consists of bimetal, dish-shaped springs 10. In the illustrated embodiment, the springs 10 are stacked in packets 11 of four individual springs all facing the same direction. These packets 11 are then stacked with the springs 10 of alternate packets 11 facing in respective alternate directions. The bimetal dish-shaped springs 10 are held under initial tension between two guide plates 12 and 13 arranged in the recess 8. Initial tension is effected by a tension bolt 14 supporting itself in the area of the tension roller 6 on the support arm 3 and the centric recess on the guide plate 13 as well as the screw bolts 5 holding the guide plate 12 in position. The bimetal dish-shaped springs 10 are concentrically aligned on an axle or (shaft) 15 guided in the guide plates 12 and 13. The side of the cylindrical recess 8 facing the tension roller 6 is closed by a collar 16 as a protection against dirt.

The mode of operation of the tensioning device is as follows. By means of the screw bolt 5, the initial tension with which the bimetal dish-shaped springs 10 rest one against the other, is adjusted corresponding to the required gear belt tension. With increasing heat of the internal combustion engine, the intensity of the dish-shape of the bimetal dish-shaped springs 10 is decreased (length of temperature responsive control element 9 comprised of the composite stacked packets of springs in the direction of guide shaft 15 is decreased) whereby the tension roller 6 is adjusted in the direction toward the abutment 2 so that a uniform gear belt tension is present also with a warmer internal combustion engine. If the internal combustion engine cools off, the intensity of the dish-shape of the bimetal dish-shaped springs 10 and the tension roller 6 is adjusted in opposition to the abutment 2 to thereby take care of the yielding gear belt tension in dependence of the temperature of the internal combustion engine. Through a corresponding selection of the intensity of the dish-shape of the bimetal dish-shaped springs, the strength of the material, the manner of stacking and the initial tension, the inventive tensioning device may be utilized with internal combustion engines of different construction and output. In each case, the maintenance of a uniform gear belt tension and a flutter-free operation is assured and a skipping of the gear-belt 7 during return rotation of the internal combustion engine is safely avoided.

While we have shown and described only a single embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. Gear belt tensioning apparatus for controlling the tension in a gear belt for driving an internal combustion engine camshaft or the like, said apparatus comprising:
   a tension roller engageable directly with a gear belt for directly controlling the tension of said gear belt as a function of the position of the tension roller,
   a relatively fixed abutment,
   and temperature responsive control element means interposed between said tension roller and said abutment for controlling the position of said tension roller with respect to said abutment as a function of the temperature of the control element means.

2. Apparatus according to claim 1, wherein said control element means includes a plurality of bimetal dish-shaped spring members facing in alternating opposite directions.

3. Apparatus according to claim 2, wherein said dish-shaped spring members are stacked in packets which each contain a plurality of spring members facing the same direction, and wherein the packets are disposed with the spring members thereof facing oppositely of the spring members of the next adjacent packet.

4. Apparatus according to claim 3, wherein the dish-shaped spring members are arranged in a cylindrical recess of a receiver fastened to an internal combustion engine housing between two guide plates in the recess under initial tension, said receiver being fixedly connected with and forming part of said abutment.

5. Apparatus according to claim 4, wherein one of the guide plates is held in position directly by the tension-roller and the other guide plate is pressed against the spring members by a screw bolt, said screw bolt being adjustably guided in the receiver and forming the abutment together with the receiver.

6. Apparatus according to claim 5, wherein the tensioning roller is arranged swingably by means of a support arm at the internal combustion engine housing, and wherein the support arm is itself supported in the area of the tension roller on a centric tension bolt which engages one of said guide plates, said tension bolt being held in position by the tension roller.

7. Apparatus according to claim 6, wherein the spring members are centrically aligned on an axle guided in the guide plates.

8. Apparatus according to claim 2, wherein the dish-shaped spring members are arranged in a cylindrical recess of a receiver fastened to an internal combustion engine housing between two guide plates in the recess under initial tension, said receiver being fixedly connected with and forming part of said abutment.

9. Apparatus according to claim 8, wherein one of the guide plates is held in position directly by the tension-roller and the other guide plate is pressed against the spring members by a screw bolt, said screw bolt being adjustably guided in the receiver and forming the abutment together with the receiver.

10. Apparatus according to claim 9, wherein the tensioning roller is arranged swingably by means of a support arm at the internal combustion engine housing, and wherein the support arm is itself supported in the area of the tension roller on a centric tension bolt which engages one of said guide plates, said tension bolt being held in position by the tension roller.

11. Apparatus according to claim 8, wherein the spring members are centrically aligned on an axle guided in the guide plates.

* * * * *